United States Patent
Lonsky et al.

(10) Patent No.: US 6,261,753 B1
(45) Date of Patent: *Jul. 17, 2001

(54) USE OF INDOLENINE-CYANINEDISULPHONIC ACID DERIVATIVES

(75) Inventors: Ralph Lonsky, Neustadt; Lutz Uwe Lehmann, Seelze, both of (DE)

(73) Assignee: Riedel-De Haen Aktiengesellschaft, Seelze (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/232,976

(22) Filed: Mar. 12, 1998

Related U.S. Application Data

(62) Division of application No. 08/856,890, filed on Mar. 12, 1998, now Pat. No. 5,747,233, which is a continuation of application No. 08/504,107, filed on Jul. 19, 1995, now abandoned.

(30) Foreign Application Priority Data

Jul. 29, 1994 (DE) .................................. 44 26 892

(51) Int. Cl.$^7$ .............................. G03C 1/06; G03C 1/815; G03C 1/825
(52) U.S. Cl. .................. 430/522; 430/510; 430/517; 430/944; 430/592; 430/495; 430/581; 430/583; 430/585; 430/588
(58) Field of Search .................. 430/522, 495, 430/510, 517, 944, 592, 581, 583, 585, 588

(56) References Cited

U.S. PATENT DOCUMENTS

| | | | |
|---|---|---|---|
| 4,839,265 | 6/1989 | Ohno et al. | |
| 4,871,656 | 10/1989 | Parton et al. | 430/522 |
| 4,876,181 | 10/1989 | Proehl et al. | |
| 4,914,001 | * 4/1990 | Inagaki et al. | 430/495 |
| 5,445,930 | 8/1995 | Harada et al. | |
| 5,747,233 | * 5/1998 | Lonsky et al. | 430/522 |

FOREIGN PATENT DOCUMENTS

| | | |
|---|---|---|
| 251282 | 1/1988 | (EP) . |
| 288083 | 10/1988 | (EP) . |
| 445627 | 9/1991 | (EP) . |
| 591820 | 4/1994 | (EP) . |
| 1-147451 | 6/1989 | (JP) . |

OTHER PUBLICATIONS

Chem. Abstr. 146699z 115:732 (1991).
Chem. Abst. 169019e 112:730 (1990).
Chem. Abst. 108465a 112:663 (1990).

* cited by examiner

*Primary Examiner*—Geraldine Letscher
(74) *Attorney, Agent, or Firm*—Connolly Bove Lodge & Hutz LLP

(57) ABSTRACT

The present invention relates to the use of dye-stuffs of the general formula I

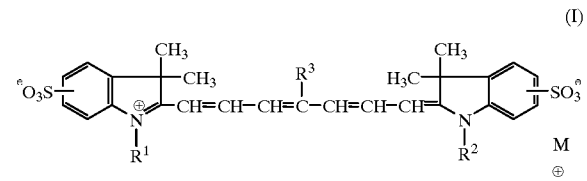

(I)

in which $R^1$, $R^2$ and $R^3$ and $M^-$ are as defined in claim 1, as infra-red-absorbing agents in hydrophilic colloidal layers, for example in recording materials or for detection purposes, recording materials, for example photographic recording materials, which comprise such dyestuffs in hydrophilic colloidal layers, and new dyestuffs of the general formula I.

2 Claims, No Drawings

USE OF INDOLENINE-CYANINEDISULPHONIC ACID DERIVATIVES

Use of indolenine-cyaninedisulphonic acid derivatives

This application is a divisional application of U.S. application Ser. No. 08/856,890, filed May 15, 1997 now U.S. Pat. No. 5,747,233, which is a continuation of U.S. application Ser. No. 08/504,107, filed on Jul. 19, 1995, now abandoned.

The present invention relates to the use of indolenine-cyanine dyestuffs as infrared-absorbing agents in hydrophilic colloidal layers, specifically those in recording materials, in particular photographic recording materials, and to such materials for IR detection processes which furthermore comprise hydrophilic colloidal layers with such indolenine-cyanine dyestuffs, and new indolenine-cyanine dyestuffs.

It is known to use colloidal layers which comprise dyestuffs, including infrared-absorbing dyestuffs, in photographic recording materials, in particular those based on silver halide. Photographic recording materials in general have a multi-layer structure. The dyestuff-containing layers can be employed in various positions in the multi-layer material. The photosensitive colloidal layer or layers comprising silver halides can comprise dyestuffs directly. In this context, infrared sensitive materials based on silver halide comprise one or more colloidal layers having one or more infrared-absorbing dyestuffs as sensitizers. However, layers comprising dyestuffs, in particular also infrared-absorbing dye-stuffs, also function, for example, as auxiliary or filter layers.

For example, dyestuff-containing layers have the task, inter alia, of increasing the imaging sharpness of the recording materials. It is also known in this context to apply dyestuff-containing layers to the reverse of a photographic material to suppress halation effects caused by reflection of scattered light (antihalation layers).

It is furthermore also known that infrared-detecting apparatuses can advantageously be used for automatic process control or management, in particular also for automatic process control or management during the production and working or processing of recording materials. So that the material to be worked for example the recording material, is capable of interaction with the control unit, it must have a suitable infrared absorption. Control detectors which operate in the range from 850 to 950 nm, which requires a corresponding absorption, for example of the recording material in this range, are typically used. The desired secondary actions are triggered off according to whether the detection system, which can comprise, for example, an infrared laser, detects an absorption or no absorption in a certain range. Analogue detection coupling is also possible. It is furthermore known that IR-detecting apparatuses can advantageously be employed for recognition of IR-absorbing materials. Thus, for example, documents, securities, letters and the like can be marked or coded by application of one or more IR-absorbing layers over the entire material or on selected positions.

Dyestuffs which are suitable for the above purposes must have, in particular, suitable absorption characteristics. For use in photographic recording materials, the dyestuffs must be decolorized completely during the photographic wet processing process, and/or they must be readily washed out of the photographic material, so that the developed material displays no residual coloration after processing. Furthermore, no stain of the baths should occur.

It is known to use infrared-absorbing dyestuffs of the heptamethine-cyanine type with indolenine end groups, in particular for infrared-sensitive photographic silver halide materials (see, for example, U.S. Pat. No. 4,876,181; EP-A-445 627; Chem. Abstr. 112:169019e (1990); Chem. Abstr. 112:108465a (1990)). However, these dye-stuffs do not meet, or meet only in part, the requirements imposed. In particular, these indolenine-hepta-methine-cyanines have the disadvantage that, with all the proposed substitution patterns, they absorb in too short a wavelength, i.e. they are not capable of providing an adequate IR absorption in the range from 850 to 950 nm, which is important for IR detection purposes. In order to $(C_1-C_6)$-Alkyl groups and $(C_1-C_4)$-alkyl groups can be straight-chain or branched and are, for example, methyl, ethyl, n-propyl, i-propyl, n-butyl, i-butyl, sec-butyl, tert-butyl, n-pentyl, 3-methylbutyl or n-hexyl. The same applies if alkyl groups are substituted or occur as substituents, for example on phenyl groups or in alkoxy groups. n-Alkyl groups are preferred, particularly preferably $(C_1-C_3)$-n-alkyl groups, such as methyl, ethyl and n-propyl. Methyl is a very particularly preferred alkyl group.

Alkyl which is substituted by halogen or phenyl is, for example, benzyl, 1-phenylethyl, 2-phenylethyl, 3-phenylpropyl, 4-phenylbutyl, 2-fluoroethyl, 2-chloroethyl, 2-bromoethyl, 3-chloropropyl, 2-chloro-2-methylpropyl, 4-chlorobutyl or 6-chlorohexyl.

A substituent on an alkyl group is preferably bonded to the terminal C atom of the alkyl group.

Substituted phenyl is preferably phenyl which is mono- or disubstituted by $(C_1-C_4)$-alkoxy, $(C_1-C_4)$-alkyl, halogen or $(C_1-C_4)$-alkoxycarbonyl. Monosubstituted phenyl can be substituted in the 2-, the 3- or the 4-position, and disubstituted phenyl can be substituted, for example, in the 2,3-, in the 3,4- or in the 3,5-position. Preferably, substituted phenyl is substituted in the 4-position.

Halogen is, in particular, fluorine, chlorine, bromine and iodine, chlorine being preferred, and $(C_3-C_7)$-cycloalkyl is, in particular, cyclopropyl, cyclobutyl, cyclopentyl, cyclohexyl and cycloheptyl.

The sulphonate groups in the indolenine end groups of the dyestuffs of the general formula I can be in the 5- or the 6-position of the indole ring-system and can also be in different positions in the two end groups.

They are preferably in the 5-position of the indole ring-system. They are also preferably in the same position in the two end groups.

$R^1$ and $R^2$ are preferably hydrogen, $(C_1-C_4)$-alkyl, which can also be substituted by phenyl, or phenyl. $R^1$ and $R^2$ are particularly preferably $(C_1-C_3)$-n-alkyl, and furthermore benzyl, and very particularly preferably methyl. $R^1$ and $R^2$ also preferably have the same meaning.

$R^3$ is preferably hydrogen or $(C_1-C_4)$-alkyl, and furthermore $(C_1-C_4)$-alkyl, which is substituted by phenyl, phenyl, halogen or $(C_3-C_7)$-cycloalkyl. $R^3$ is particularly preferably hydrogen, $(C_1-C_3)$-n-alkyl, benzyl, phenyl or halogen, very particularly preferably hydrogen or methyl.

M˙ is, for example, a cation or cation equivalent of main group or sub-group elements, for example of the alkali metals lithium, sodium, potassium, rubidium and caesium, the alkaline earth metals magnesium, calcium, strontium and barium, or, for example, the transition metals zinc, nickel and the like, or is also the hydrogen ion or, for example, a substituted ammonium ion or the ammonium ion itself. Possible substituted ammonium ions are, for example, ammonium ions which contain one, two, a three or four identical or different radicals from the series consisting of alkyl, hydroxyalkyl, phenylalkyl and phenyl, the above comments applying to alkyl groups, and $(C_1-C_4)$-alkyl groups being preferred. Examples are the dimethyl-, the trimethylt, the triethyl-, the ethyldiiso-propyl-, the tetramethyl-, the tetraethyl-, the 2-hydroxyethyl-, the tris-(2-hydroxyethyl)-, the phenyltrimethyl-, the benzyltrimethyl-, the benzyltriethyl-, the diphenyldimethyl- or the tetraphenylammonium ion.

Cations M⁻ are preferably monovalent cations, alkali metal cations, substituted ammonium ions and the ammonium ion itself as well as the hydrogen ion being particularly preferred. M⁻ is very particularly preferably the sodium ion, the potassium ion, the ammonium ion, the triethylammonium ion and the hydrogen ion.

The dyestuff of the general formula I in which the two sulphonate groups are in the 5-positions of the two terminal indole systems and in which $R^1$ and $R^2$ are methyl and $R^3$ is hydrogen and M⁻ is the sodium, potassium, ammonium or triethylammonium ion, preferably the sodium ion, is preferably employed according to the invention.

The dyestuffs of the general formula I which can be employed according to the invention can be obtained in a simple manner which is known per se, for example by reaction of the corresponding 2,3,3-trimethyl-3H-indolium sulphonate which carries the radical $R^1$ or $R^2$ in the 1-position with the corresponding glutacondialdehyde, which is as a rule employed in the form of its dianil hydrochloride, under the customary conditions of cyanine dyestuff preparation which are familiar to the expert (see, for example, F. M. Hamer, Cyanine Dyes and Related Compounds, John Wiley & Sons, 1964). The preparation examples illustrate the preparation process.

When used according to the invention, the dye-stuffs of the general formula I are preferably employed in hydrophilic colloidal layers in amounts of from 5 to 500 mg/m², particularly preferably 10 to 200 mg/m².

The dyestuffs of the general formula I can be incorporated into the colloidal layer in a simple manner which is known per se. For example, the dyestuffs are dissolved in a suitable solvent, in particular water or alcohols, such as, for example, ethanol or methanol, and then incorporated into a colloidal binder, if appropriate together with further additives, for example wetting agents. Hydrophilic colloidal binders, that is to say the basis of the hydrophilic colloidal layer, can be the customary substances, such as gelatine, polyvinyl alcohol, carboxymethylcellulose, sodium alginate, casein or polyvinylpyrrolidone. Gelatine is preferably used, by itself or as a mixture with one or more other binders.

In addition to the colloidal binder and the dyestuff or dyestuffs of the general formula I, and if desired other dyestuffs, the hydrophilic colloidal composition can comprise ingredients of any customary type, for example coating additives, hardening agents, wetting agents, matting agents, thickeners, plasticizers and the like (compare Research Disclosure, Volume 308 (1989), Item 308119; and Volume 176 (1978), Item 17643). Synthetic polymers (as aqueous dispersions) furthermore can be used as additives for dimensional stability ("latices"). These polymers include, inter alia, polymers of, for example, alkyl (meth)acrylates, alkoxyalkyl (meth)acrylates, (meth)acrylamides, vinyl esters or olefines, by themselves or in combination, for example also with organic acids, such as (meth)acrylic acid. The coating solutions obtained in this way can be applied in layer form by a process which is known per se (described, for example, in "Science and Technology of Photography", Karlheinz Keller (ed.), VCR Verlagsges.mbH, Weinheim, 1993), it being possible for all materials which can be coated hydrophilically to be used as support. Customary support which can be employed are, for example, polymers, such as polyethylene glycol terephthalate films, glass, paper or precoated papers, etc. As a rule, the support is provided with a customary adhesive layer here.

The dyestuffs of the general formula I to be used according to the invention can easily be incorporated into the colloidal layers, impart to them suitable IR absorption characteristics and, when employed in photo-graphic recording materials, are decolorized irreversibly during the photographic development process. When the dyestuffs of the general formula I are used as infrared-absorbing agents in hydrophilic colloidal layers, for example those in recording materials, specifically photographic and reprographic recording materials, in particular those based on silver halide, it is particularly advantageous that high IR absorptions, in particular in the IR range from 800 to 1000 nm, specifically in the range from 850 to 950 nm, are achieved even with small amounts of dyestuff. These surprisingly favourable absorption characteristics which are preferably utilized are probably due to the fact that the dyestuffs of the general formula I can be present in the hydrophilic colloidal layer in the form of J aggregates which absorb at long wavelengths (compare T. H. James, The Theory of the Photographic Process, 4th ed., Macmillan Publ. Co. Inc., London 1977). The finding that J aggregates of the dyestuffs of the general formula I employed according to the invention, once formed at a sufficiently high dye-stuff concentration for aggregation, have a high stability and persist on dilution, even if the final concentration of dyestuff is so low that no J aggregates are formed when a solution of this concentration is prepared directly by dissolving the corresponding amount of dyestuff in the final volume is furthermore particularly advantageous and in no way foreseeable. In any case, by dilution of a colloidal composition which initially comprises the dyestuffs of the general formula I in a concentration sufficiently high for aggregate formation, intense long wavelength IR absorptions also of the colloidal layer obtainable from the diluted composition can be achieved with considerably lower amounts of dyestuff than if the amount of dyestuff required for the same final concentration of dyestuff in the colloidal layer is dissolved directly to give a dilute solution. The higher extinction coefficient of the aggregate in particular also has a positive effect here. This saving in dyestuff is a considerable economic advantage. Procedures in which the J aggregates are generated in a coating solution with a high dyestuff concentration and, after the aggregates have been formed, the solution is brought in a dilution step to the coating concentration desired for production of the layer, the J aggregates persisting and not dissociating again, are therefore preferred for the production of colloidal layers which comprise the dyestuffs of the general formula I to be used according to the invention.

The hydrophilic colloidal layers according to the invention which comprise dyestuffs of the general formula I as infrared-absorbing agents are employed, for example, in recording materials or in materials which are used in combination with IR-detecting apparatuses. Photographic and reprographic recording materials, in particular those based on silver halide, are preferred here. The layers comprising dyestuffs of the general formula I have the function here, in particular, of auxiliary and filter layers, for example they can function—as already explained above—as an antihalation layer, it also being possible for the colloidal layers to comprise additional dyestuffs, which absorb at relatively short wavelengths in particular, in accordance with the prior art. In connection with infrared-detecting apparatuses, however, these layers can also be used at the same time for automatic process control or management. In general, the hydrophilic colloidal layers according to the invention which comprise dyestuffs of the general formula I as infrared-absorbing agents and which—as already stated—can be applied to the most diverse support materials can be employed as a detection layer for infrared-detecting apparatuses, for example in IR laser detection systems.

The present invention also relates to materials, in particular recording materials, preferably photographic and reprographic recording materials, particularly preferably based on silver halide, which are characterized in that they comprise, as infrared-absorbing agents in one or more hydrophilic colloidal layers, one or more dyestuffs of the general formula I

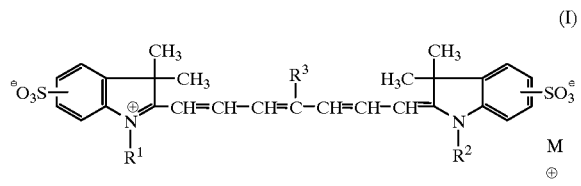

(I)

in which $R^1$, $R^2$ and $R^3$ independently of one another are hydrogen, $(C_1-C_6)$-alkyl which is unsubstituted or monosubstituted by halogen or phenyl, or unsubstituted or mono- or disubstituted phenyl, and $R^3$ furthermore is also halogen or $(C_3-C_7)$-cycloalkyl, but wherein no sulpho or sulphonate groups, no carboxyl or carboxylate groups and no sulphato groups may occur as a substituent in phenyl groups, and $M^*$ is a monovalent cation or one equivalent of a polyvalent cation.

The statements already made above for the dye-stuffs, the substituents in the general formula I, the colloidal layers, the support and the like apply to the recording materials according to the invention. The recording materials thus as a rule have, for example, a multi-layer structure, it being possible for layers with dyestuffs of the general formula I to be employed in any position within the material. Polyvinyl alcohol, carboxy-methylcellulose, sodium alginate, casein or polyvinylpyr-rolidone, and preferably gelatine, can be present, for example, as the hydrophilic colloid, and the materials mentioned furthermore can also be used in any desired mixtures with one another. The colloidal layers as a rule also additionally comprise other ingredients, for example coating additives, wetting agents, hardening agents, matting agents, thickeners, plasticizers and the like. Supports for the recording materials according to the invention can comprise the substances usually employed for this purpose, for example polymers, such as polyethylene glycol terephthalate, glass, paper, coated paper and the like. The colloidal layer or layers of the recording materials according to the invention preferably comprise the dyestuff or dyestuffs of the general formula I in amounts of 5 to 500 mg/m², particularly preferably 10 to 200 mg/m². The recording materials according to the invention preferably comprise the dyestuffs of the general formula I described above as preferred.

The following dyestuffs of the general formula I are known concretely (see Chem. Abstr. 111:144195a (1989); Chem. Abstr. 115: 146699z (1991) and Chem. Abstr. 110:222544j (1989)):

a) substances of the formula I in which the sulphonate groups are in the 5-positions of the two indole systems, $R^1$ and $R^2$ are methyl, $R^3$ is hydrogen and $M^*$ is Na· or ½ $Ni^{2\cdot}$;

b) substance of the formula I in which the sulphonate groups are in the 6-positions of the two indole systems, $R^1$ and $R_2$ are methyl, $R_3$ is hydrogen and $M^*$ is K·;

c) substance of the formula I in which the sulphonate groups are in the 5-positions of the two indole systems, $R^1$ and $R^2$ are ethyl, $R^3$ is methyl and $M^*$ is K·.

The present invention also relates to the cyanine dyestuffs, which have not previously been known, of the general formula I

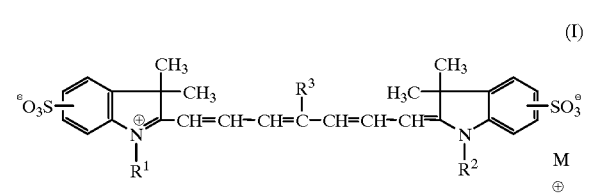

(I)

in which $R_1$, $R_2$ and $R_3$ independently of one another are hydrogen, $(C_1-C_6)$-alkyl which is unsubstituted or monosubstituted by halogen or phenyl, or unsubstituted or mono- or disubstituted phenyl, and $R_3$ furthermore is also halogen or $(C_3-C_7)$-cycloalkyl, but wherein no sulpho or sulphonate groups, no carboxyl or carboxylate groups and no sulphato groups may occur as a substituent in phenyl groups, and $M^*$ is a monovalent cation or one equivalent of a polyvalent cation, but excluding those compounds of the general formula I in as which, simultaneously, the sulphonate groups are in the 5-positions of the two indole systems, $R_1$ and $R2$ are methyl, $R^3$ is hydrogen and $M^*$ is Na· or ½ $Ni^{2\cdot}$, that compound in which, simultaneously, the sulphonate groups are in the 6-positions of the two indole systems, $R^1$ and $R^2$ are methyl, $R^3$ is hydrogen and $M^*$ is K·, and that compound of the general formula I in which, simultaneously, the sulphonate groups are in the 5-positions of the two indole systems, $R^1$ and $R^2$ are ethyl, $R^3$ is methyl and $M^*$ is K·.

The above statements are expressly referred to with regard to explanations of the substituents in the cyanine dyestuffs of the general formula I according to the invention. This also applies to preferred meanings of the substituents, the excluded compounds being noted.

The substances of the general formula I according to the invention can be obtained under customary conditions by preparation processes which are known per se, for example—as already explained above—from the corresponding trimuthyl-3H-indoliumsulphonates with glutacondialdehyde derivatives. The cyanine dyestuffs of the general formula are used, for example, as infrared-absorbing agents in colloidal layers in recording materials, for example photographic recording materials, in which they have a surprisingly long wavelength and surprisingly intense absorption.

EXAMPLES

Preparation Example 1

Preparation of the dyestuff of the formula Ia:

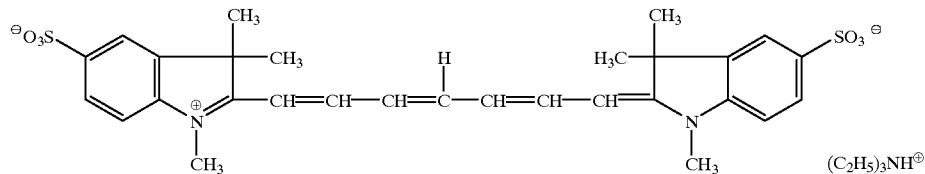

(Ia)

A mixture of 5.1 g of 1,2,3,3-tetramethyl-3H-indolium-5-sulphonate (compare Alan S. Waggoner et al., Bioconjugate Chemistry 4 (2), 105–111 (1993)), 30 ml of acetic anhydride, 2.8 g of glutacondialdehyde-dianil hydrochloride and 5 ml of triethylamine is heated under reflux for 5 minutes. It is then cooled to 20° C. and the dyestuff which has precipitated out is separated off and dried. The dyestuff is obtained as a dark powder. $\lambda$max+742 nm (water).

Preparation Example 2

Preparation of the dyestuff of the formula Ib:

The dyestuff of the formula Ib is obtained analogously to Preparation Example 1, but instead of 2.8 g of glutacondialdehyde-dianil hydrochloride, 2.95 g of 3-methylglutacondialdehyde-dianilhydrochloride are employed. The dyestuff is obtained as a dark powder. $\lambda$max 755 nm (water).

Use Example 1

Starting solutions (solutions 1a and 1b) of the following composition are prepared:

| Water | 188.0 ml |
|---|---|
| Dyestuff Ia or Ib | 0.5 g |
| Inert gelatine | 12.0 g |
| Sodium dodecyl sulphate (1% strength aqueous solution) | 10.0 ml |
| Polyacrylate latex (30% strength aqueous dispersion) (particle diameter about 2 μm) | 10.0 ml |
| Formaldehyde (5% strength aqueous solution) | 10.0 ml |

The solutions thus prepared are diluted with the amounts of water stated in Table 1 and coated in a conventional manner onto a polyethylene glycol terephthalate support provided with an adhesive layer. The absorption maxima, the amount of dyestuff per $m^2$ and the optical density (decadic internal absorbance) A at the absorption maximum of the resulting gelatine layers are listed in the following Table 1.

TABLE 1

| Coating No. | Dyestuff | Amount of water [g] | Amount of dyestuff [mg/m²] | λmax [nm] | A at λmax |
|---|---|---|---|---|---|
| 1 | Ia | 220 | 98 | 920 | 3.0 |
| 2 | Ia | 330 | 72 | 920 | 2.1 |
| 3 | Ia | 440 | 40 | 920 | 1.2 |
| 4 | Ib | 220 | 101 | 926 | 2.9 |

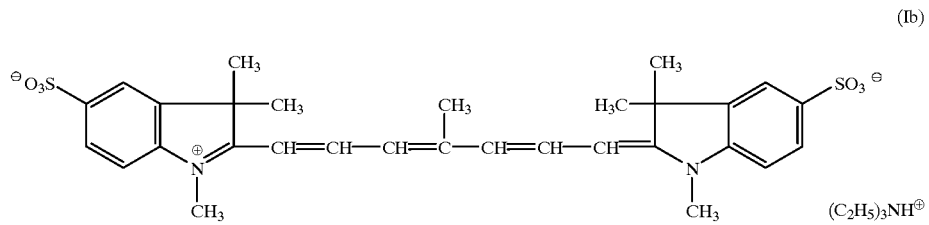

(Ib)

TABLE 1-continued

| Coating No. | Dyestuff | Amount of water [g] | Amount of dyestuff [mg/m²] | λmax [nm] | A at λmax |
|---|---|---|---|---|---|
| 5 | Ib | 330 | 74 | 926 | 1.9 |
| 6 | Ib | 440 | 39 | 926 | 1.2 |

For comparison purposes, a coated solution (solution 2) of the following composition was prepared:

| Water | 188.00 ml |
|---|---|
| Dyestuff Ia | 0.075 g |
| Inert gelatine | 12.00 g |
| Sodium dodecyl sulphate (1% strength aqueous solution) | 10.00 ml |
| Polyacrylate latex (30% strength aqueous dispersion) (particle diameter about 2 μm) | 10.00 ml |
| Formaldehyde (5% strength aqueous solution) | 10.00 ml |

The solution was likewise coated in a conventional manner onto a support provided with an adhesive layer. The absorption maximum, the amount of dyestuff per $m^2$ and the optical density (decadic internal absorbance) A at the absorption maximum and at 920 nm of the resulting gelatine layer are listed in the following Table 2.

TABLE 2

| Coating No. | Dyestuff | Amount of dyestuff [mg/m$^2$] | λmax [nm] | A at λmax | A at 920 nm |
|---|---|---|---|---|---|
| 7 | Ia | 40 | 759 | 0.6 | <0.1 |

The results show that the J aggregates are retained when starting solutions Ia and Ib are diluted, so that the optical density (decadic internal absorbance) of the resulting layers at the absorption maximum is proportional to the amount of dyestuff per m$^2$, regardless of the amount of water added. In contrast, the layer which is obtained with solution 2, which contains only a lower dyestuff concentration from the beginning, shows no aggregations. The comparison of coating No. 3, 6 and 7, all of which comprise about 40 mg of dyestuff per m$^2$, shows the particular advantage, which exists in the presence of an intense long wavelength absorption band at 850 to 950 nm, of a procedure which comprises a dilution step starting from a concentrated dyestuff solution.

Use Example 2

Ready-to-coat solutions 1 to 7 were first stored at 35° C. for 6 hours without addition of the formaldehyde solution, and then subsequently applied to a support as in Use Example 1, after addition of the formaldehyde solution.

The resulting layers gave the same results as were obtained with the coating solutions which had not been stored, and the absorption curves in the range from 400 to 1100 nm were practically identical.

Use Example 3

The dyestuff-containing hydrophilic colloidal layers from coating No. 1 to 6 obtained in Use Example 1 were subjected to the following photographic processing process to check whether they are decolorized rapidly and completely in photographic processing solutions:

Development for 2 minutes in a customary Metol-hydroquinone developer at 20° C., subsequent treatment for 5 minutes in a customary fixing bath (comprising sodium thiosulphate and sodium disulphite) and subsequent rinsing for 10 minutes with water and then drying.

The residual colorations were evaluated visually. The results shown in Table 3 were obtained.

TABLE 3

| Coating No. | Residual coloration |
|---|---|
| 1 | none |
| 2 | none |
| 3 | none |
| 4 | none |
| 5 | none |
| 6 | none |

Dyestuffs 1a and 1b used according to the invention thus leave behind no residual coloration.

What is claimed is:

1. A recording material which contains, in at least one hydrophilic colloidal layer, an infrared absorbing agent comprising a dyestuff of the general formula I

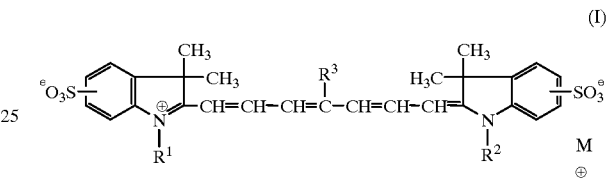

in which R$^1$, R$^2$ and R$^3$ independently of one another are hydrogen, (C$_1$–C$_6$)-alkyl which is unsubstituted or mono-substituted by halogen or phenyl, or unsubstituted or mono- or di-substituted phenyl, and R$^3$ furthermore is also halogen or (C$_3$–C$_7$)-cycloalkyl, but wherein no sulpho or sulphonate groups, no carboxyl or carboxylate groups and no sulphato groups may occur as a substituent in phenyl groups, wherein the sulphonate groups are in the 5-position of the terminal indole rings, and M$^+$ is a monovalent cation or one equivalent of a polyvalent cation, but excluding the compound of general formula I in which R$^1$ and R$^2$ are methyl, R$^3$ is hydrogen and M$_+$ is ½ Ni$^{2+}$.

2. The recording material of claim 1 wherein, in the dyestuff of general formula I, R$^1$ and R$^2$ are methyl, R$^3$ is hydrogen, and M is Na.

* * * * *

UNITED STATES PATENT AND TRADEMARK OFFICE
CERTIFICATE OF CORRECTION

PATENT NO. : 6,261,753 B1  Page 1 of 1
DATED : July 17, 2001
INVENTOR(S) : Ralph Lonsky and Lutz Uwe Lehmann It is certified that error appears in the above-identified patent and that said Letters Patent is hereby corrected as shown below:

Column 10,
Line 41, last line of claim 1, please replace "$M_+$" with -- $M^+$ --.

Signed and Sealed this

Eleventh Day of December, 2001

*Attest:*

*Nicholas P. Godici*

*Attesting Officer*

NICHOLAS P. GODICI
*Acting Director of the United States Patent and Trademark Office*